(12) United States Patent
Jimenez

(10) Patent No.: US 11,325,612 B2
(45) Date of Patent: May 10, 2022

(54) PASSENGER SAFETY SYSTEM

(71) Applicant: Victor Betancourt Jimenez, Tempe, AZ (US)

(72) Inventor: Victor Betancourt Jimenez, Tempe, AZ (US)

(*) Notice: Subject to any disclaimer, the term of this patent is extended or adjusted under 35 U.S.C. 154(b) by 0 days.

(21) Appl. No.: 17/127,081

(22) Filed: Dec. 18, 2020

(65) Prior Publication Data

US 2021/0101611 A1    Apr. 8, 2021

Related U.S. Application Data

(60) Provisional application No. 62/949,956, filed on Dec. 18, 2019.

(51) Int. Cl.
*B60W 50/14* (2020.01)
*B60N 2/00* (2006.01)
*B60K 37/02* (2006.01)

(52) U.S. Cl.
CPC ............. *B60W 50/14* (2013.01); *B60K 37/02* (2013.01); *B60N 2/002* (2013.01); *B60K 2370/152* (2019.05); *B60K 2370/178* (2019.05); *B60W 2050/143* (2013.01); *B60W 2050/146* (2013.01)

(58) Field of Classification Search
CPC ........... B60W 50/14; B60W 2050/143; B60W 2050/146; B60K 37/02; B60K 2370/152; B60K 2370/178; B60N 2/002
See application file for complete search history.

(56) References Cited

U.S. PATENT DOCUMENTS

| | | | | |
|---|---|---|---|---|
| 9,014,920 | B1* | 4/2015 | Torres | B60R 25/10 701/45 |
| 10,297,130 | B2* | 5/2019 | Friedman | G08B 21/22 |
| 2009/0027188 | A1* | 1/2009 | Saban | B60N 2/002 340/521 |
| 2009/0040036 | A1* | 2/2009 | Talis | B60Q 5/00 340/457.1 |
| 2009/0259369 | A1* | 10/2009 | Saban | B60R 21/01556 701/45 |
| 2010/0302022 | A1* | 12/2010 | Saban | B60N 2/002 340/459 |
| 2011/0267186 | A1* | 11/2011 | Rao | B60K 28/08 340/449 |
| 2016/0031342 | A1* | 2/2016 | Camello | B60N 2/002 701/45 |
| 2016/0339838 | A1* | 11/2016 | Diaz | B60N 2/2866 |
| 2017/0106789 | A1* | 4/2017 | Holdbrook-Smith | G08B 21/24 |
| 2017/0232887 | A1* | 8/2017 | Clontz | B60N 2/002 340/457 |

(Continued)

*Primary Examiner* — Chico A Foxx
(74) *Attorney, Agent, or Firm* — Barry Choobin; Patent 360

(57) ABSTRACT

Disclosed is a passenger safety system for a vehicle that can remind a driver of the vehicle to check seats before leaving the vehicle. The system includes a control unit connected to an ignition sensor. The control unit can receive a signal from the ignition sensor indicating turning-off the ignition. The system may also include a weight sensor installed in the rear seat of the vehicle. The weight sensor is activated when an object is placed on the rear seat. The control unit can trigger an alert upon receiving a signal from the ignition sensor and the weight sensor is active. The alert can be an audio and/or visual alert for reminding the driver.

4 Claims, 2 Drawing Sheets

(56) References Cited

U.S. PATENT DOCUMENTS

| 2018/0111597 A1* | 4/2018 | May | B60K 28/12 |
| 2018/0272894 A1* | 9/2018 | Logan | B60N 2/2806 |
| 2020/0058210 A1* | 2/2020 | Williams | G08B 21/24 |

* cited by examiner

PASSENGER SAFETY SYSTEM

CROSS-REFERENCE TO RELATED APPLICATIONS

This application claims priority to the U.S. provisional patent application Ser. No. 62/949,956, filed on Dec. 18, 2019 which is incorporated herein by reference in its entirety.

FIELD OF INVENTION

The present invention relates to a field of a passenger safety system for automobiles and more particularly, the present invention relates to a system that alerts a driver of the vehicle to check seats before leaving.

BACKGROUND

In the United States alone, 52 child deaths were reported in the year 2019 due to children left unattended in vehicles. Also known as hot car deaths, on an average 34 vehicular heatstroke deaths are reported each year in the United States. A driver of a vehicle may forget the presence of a child in the back seat while leaving the vehicle. The temperature inside the vehicle may increase over time causing heatstroke and death of the confined child.

Moreover, state laws require special seats for infants and children for additional safety during an accident. Such infant seats may be on the rear side of the vehicle. The occupants of the vehicle may forget the infant unattended in his infant seat. Besides children and infants, adult passengers in sleep or who cannot take care of themselves may also be left behind unattended in a vehicle.

Additionally, a driver may not be aware of the presence of a passenger in the vehicle. For example, in commercial vehicles, an unattended child may be left in the seat of the commercial vehicle. A driver not aware of the presence of the child may leave the vehicle leaving the child behind and unattended. Adult passengers can also be left behind in a locked vehicle. Also, articles may be left behind by the passengers in a vehicle.

Thus, there is an urgent need for a system that may alert the driver to check the seats of a vehicle before leaving the vehicle.

Hereinafter, the terms "alert", "notify", and "alarm" may be interchangeably used and can include both the audio and visual alarms.

SUMMARY OF THE INVENTION

The principal object of the present invention is therefore directed to a system for reminding a driver about the presence of a passenger in a vehicle when leaving the vehicle.

It is an additional object of the present invention that the system may provide a visual and/or audio notification to the driver not to leave a passenger behind or unattended.

It is a further object of the present invention to prevent vehicular heat stroke deaths by reminding the driver not to leave the passenger behind.

It is another object of the present invention that the system can retrofit into a conventional vehicle.

It is yet another object of the present invention that the system can also remind the driver to check the seats for any article.

It is a further object of the present invention that the system is economical to manufacture.

In one aspect, disclosed is a system for a passenger vehicle that may remind a drive to check seats for passengers and articles before leaving the vehicle. The disclosed system may include an ignition sensor for detecting the state of the ignition. The disclosed system can be coupled with the electrical system of the vehicle and powered by the battery of the vehicle.

In one aspect, the disclosed system can also include a weight sensor installed in the driver's seat and the weight sensor can detect the driver getting up from the driver's seat. Herein, the system can logically check two conditions before triggering the alarms i.e., turning off the ignition and getting-up of the driver from his seat.

In one aspect, a rear seat in the passenger vehicle can be provided with a weight sensor. Herein the system can logically check the two conditions before triggering the alarm i.e., turning-off the ignition and presence of an object on a seat of the passenger vehicle. The object can be a passenger or an article. Additionally, the disclosed system can logically check a third condition i.e., getting-up of the driver from his seat.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a system for reminding a driver of a passenger vehicle to check the seats of the vehicle before leaving. The disclosed system prevents an object from being left behind in the vehicle unattended. The object can be a passenger or an article. The passenger can be an infant, a child, an adult, wherein the driver may forget the object or unaware of the presence of the object. In the case of an adult, the adult can be sleeping in the vehicle, or the adult, due to a psychological condition, may not be able to attend himself.

Figure 1:
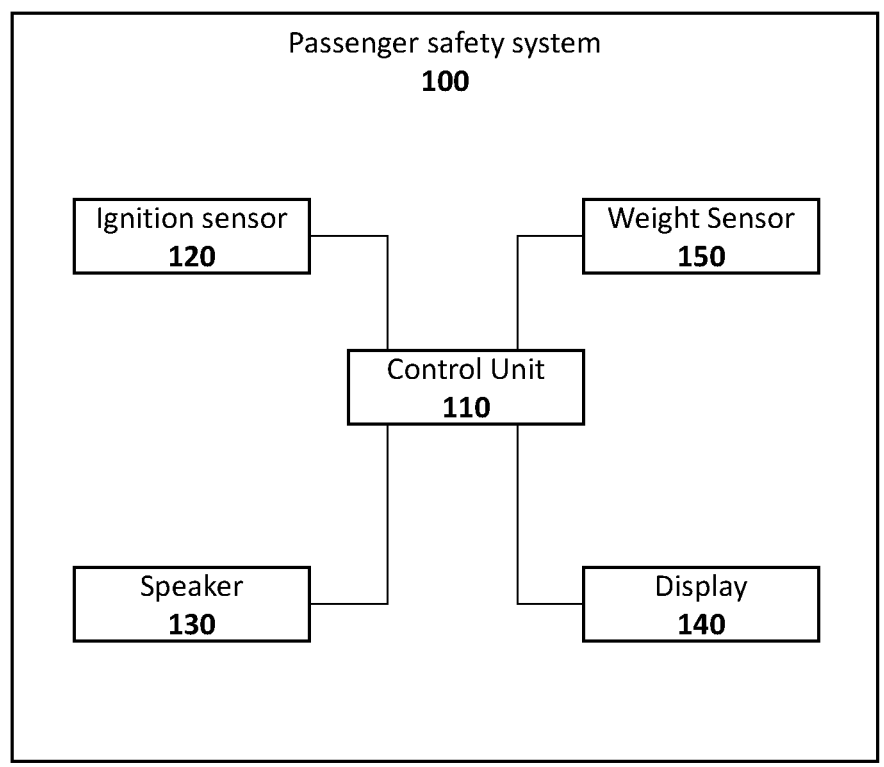
FIG. 1 is a block diagram showing the passenger safety system, according to an exemplary embodiment of the present invention.
Figure 2:
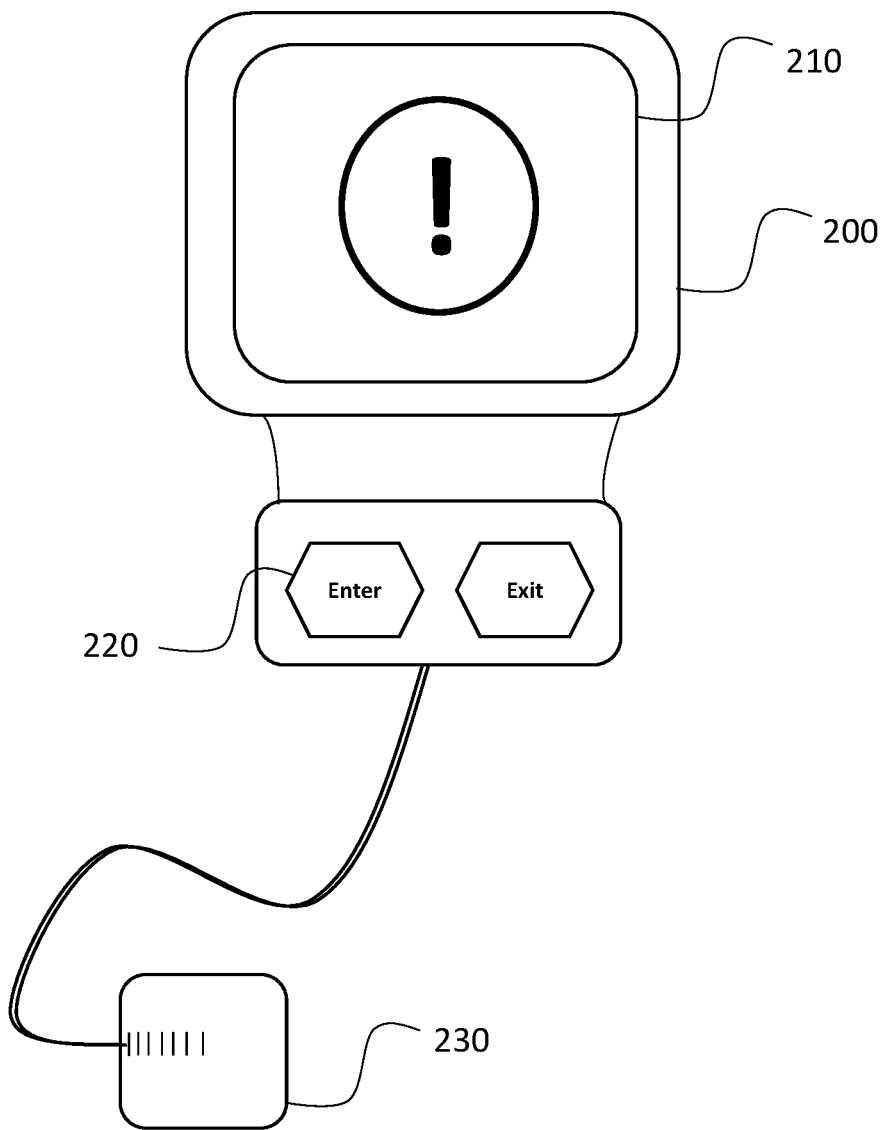
FIG. 2 shows a control unit coupled to a weight sensor, according to an exemplary embodiment of the present invention.

The disclosed system can include a control unit, an ignition sensor, one or more speakers and light indicators, and a weight sensor. The speaker can be used to broadcast an audio message or an audio alarm. The light indicators can indicate a visual alarm. The weight sensor can detect the presence of applied weight, for example, the presence of a child, person, or article on a seat of the vehicle. The control unit can also include control inputs to configure the parameters of the control unit. FIG. 1 shows an exemplary embodiment of the passenger safety system 100 having a control unit 110 connected to an ignition sensor 120, a weight sensor 150, one or more speakers 130, and a light indicator 140. FIG. 2 shows an exemplary embodiment of the control unit 200 connected to a weight sensor 230. The control unit includes a housing having a display 210. The housing includes a speaker and optionally a battery. Two control buttons 220 can also be seen in the housing that may be used to enter and exit a menu. The menu may include options for configuring the system, such as the choice of the audio message, switching between audio and visual alerts, etc. The control buttons can also be used to turn the alarm off. For example, any false alarm can be turned off. The control unit may also include a timing circuitry to automatically turn the alarm off after a predetermined duration. The disclosed control unit can also be configured in the dashboard of the vehicle. Also, the inbuilt speakers of the vehicle can be connected to the control unit while visual alerts can be displayed on the dashboard.

The ignition sensor can detect the state of the ignition i.e., turning the ignition on and off. The ignition sensor can be connected to the electrical wiring of the vehicle. Such ignition sensor which can detect the state of the ignition of a vehicle is known in the art. Any of such ignition sensors which can detect the state of the ignition are within the scope of the present invention. Turning off the ignition can trigger a signal indicating that the vehicle is turned off and the driver may leave the vehicle. The control unit upon receiving the signal from the ignition sensor can trigger the audio and/or visual alarm to remind the driver to check the seats before leaving the vehicle. The audio alarm can be an audio message "please check the seats". The visual alarm can be a notification on the dashboard of the vehicle or the display 210 of the control unit 200 as shown in FIG. 2. For example, a blinking icon may appear on the dashboard or the display.

In one embodiment, the disclosed system may include a weight sensor integrated into the driver's seat and detect the getting up of the driver from the driver seat. The weight sensor upon detecting the getting-up of the driver from his seat can send a signal to the control unit. The control unit may perform a logical check based on the signal received from the ignition sensor and the weight sensor of the driver's seat. In one case, when the ignition is turned-off and the driver is getting-up from his seat, an alarm can be triggered to remind the driver. In one case, the ignition is turned off, but the driver is still seated, the alarm may not be triggered, thus minimizing false alarms.

In one case, the disclosed system can include weight sensors installed in the rear seats of the vehicle. The weight sensor gets activated when an object is placed on the seat i.e., when weight is applied to the seat. The seat can be an infant seat or a normal seat of the vehicle. The control unit can perform a logical check i.e., if the ignition of the vehicle is turned off and the weight sensor in the passenger seat is in an active state, the alarm can be triggered to remind the driver to check the rear seat. However, if the rear passenger is empty and the ignition is turned off, the system may not trigger the alarm.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A passenger safety system for a vehicle comprising:
   a control unit connected to one or more speakers and one or more visual indicators;
   an ignition sensor electrically connected to the control unit, the control unit configured to receive a first signal from the ignition sensor, the first signal indicates turning-off the ignition;
   a first weight sensor disposed in a rear seat of the vehicle, the first weight sensor configured to get activated by a weight of an object placed on the rear seat, the first weight sensor electrically connected to the control unit, wherein the control unit is configured to receive a second signal from the first weight sensor, the second signal indicates placing of the object upon the rear seat;
   a second weight sensor disposed in a driver seat, the second weight sensor configured to detect a presence of a driver on the driver seat, wherein the second weight sensor is electrically connected to the control unit,
   wherein the control unit configured to minimize false alarms by receiving a third signal from the second weight sensor, the third signal indicates that the driver is getting off from the driver seat,
   wherein the control unit, upon receiving the first signal, the second signal, and the third signal, trigger an alert, wherein the alert is outputted through the one or more speakers and the one or more visual indicators.

2. The passenger safety system according to claim 1, wherein the visual indicator is configured in a dashboard of the vehicle.

3. The passenger safety system according to claim 1, wherein the control unit comprises a housing, a display mounted to the housing, wherein the visual indicator is presented on the display.

4. The passenger safety system according to claim 1, wherein the object is an infant.

* * * * *